(12) United States Patent
Niitsu (10) Patent No.: US 6,600,486 B2
(45) Date of Patent: Jul. 29, 2003

(54) METHOD FOR THREE-DIMENSIONAL SOLID GRAPHIC GENERATION AND RECORD MEDIUM OF THREE-DIMENSIONAL SOLID GRAPHIC GENERATION

(76) Inventor: Yasushi Niitsu, 3-1-1-504, Oguradai, Inzai-shi, Chiba 270-1356 (JP)

( * ) Notice: Subject to any disclaimer, the term of this patent is extended or adjusted under 35 U.S.C. 154(b) by 309 days.

(21) Appl. No.: 09/826,076

(22) Filed: Apr. 4, 2001

(65) Prior Publication Data

US 2001/0043211 A1 Nov. 22, 2001

(30) Foreign Application Priority Data

Apr. 12, 2000 (JP) ........................................ 2000-110625

(51) Int. Cl.[7] .............................................. G06T 17/00
(52) U.S. Cl. ........................................ 345/420; 345/964
(58) Field of Search ................................ 345/420, 964; 700/99, 182; 706/919

(56) References Cited

PUBLICATIONS

Fuller, "Using AutoCAD Release 10 with 3–D", 1989, Delmar Publishers Inc., chapter 19.*
Stair, Jr. et al., "Essentials of BASIC Programming," 1981, Richard D. Irwin, Inc., chapter 5.*

* cited by examiner

Primary Examiner—Mark Zimmerman
Assistant Examiner—Lance W. Sealey
(74) Attorney, Agent, or Firm—Flynn, Thiel, Boutell & Tanis, P.C.

(57) ABSTRACT

A method for three-dimensional solid graphic generation:

First, a basic graphic command and a variable showing a size of the graphics are inputted into an input unit as graphic data and a condition for changing the variable is inputted into the input unit. Next, a three-dimensional solid graphics is generated in an arithmetic unit by changing the size of the graphics based on the condition for changing the variable to change the shape of the graphics. Thereby, it becomes possible to express a solid with its shape changing and to express a movable solid.

20 Claims, 8 Drawing Sheets

METHOD FOR THREE-DIMENSIONAL SOLID GRAPHIC GENERATION AND RECORD MEDIUM OF THREE-DIMENSIONAL SOLID GRAPHIC GENERATION

BACKGROUND OF THE INVENTION

1. Field of the Invention

This invention relates to a method for three-dimensional solid graphic generation and a record medium of three-dimensional solid graphic generation which are capable of expressing a solid by changing its shape and expressing a movable solid, and intended preferably to be used for schooling.

2. Description of the Related Art

As conventional file formats for expressing a solid in a three-dimensional manner, a VRML format which is a standard expressing form of a three-dimensional solid in the Internet, a standard CAD file format called IGES or STEP, file formats which are established by respective CAD manufactures such as a DXF file format and so on have been hitherto known. However, these expressing forms of the three-dimensional solid express the solid in a fixed condition.

Meanwhile, part of an expressing method of a binary format such as a preprocessor of StressCheck as finite element analysis software enables parametric representation of the solid.

In this parametric representation, for example in the case of a cylinder, representative lengths of the solid such as a radius and a height are not fixed, and by designating these optionally, the solid is generated based on the designated values.

However, in the conventional expressing form, the expression of the solid with its shape changing from moment to moment and the expression of the movable solid are impossible even by the parametric representation.

That is, in the conventional art, it is difficult to generate a plurality of the graphics continuously while changing the shape of the three-dimensional solid successively, and hence, it has been desired to generate the graphics successively and continuously and to express thus generated graphics.

SUMMARY OF THE INVENTION

In view of the above circumstances, the object of the present invention is to provide a method for three-dimensional solid graphic generation and a record medium of three-dimensional solid graphic generation which are capable of expressing a solid by changing its shape and expressing a movable solid.

According to one aspect of the present invention, the method for three-dimensional solid graphic generation is provided, in which a basic graphic command showing a type of the graphics and a variable showing a size of the graphics are first inputted into an input unit as graphic data and a condition for changing the variable is inputted into the input unit, and thereafter, the three-dimensional solid graphics is generated by changing the size of the graphics based on the condition for changing the variable to change the shape of the graphics in an arithmetic unit.

The following operational sequences are taken by the method for three-dimensional solid graphic generation like this.

Namely, according to this aspect, the use of the variable makes it possible to suppress an amount of data lower when generating the graphics while changing the shape of the graphics successively. Moreover, the generated graphics are displayed successively, thereby allowing the solid to be expressed with its shape changing. Further, when the graphics are generated while moving and changing its shape successively, it is also possible to suppress the amount of data lower. Furthermore, a movable solid can be expressed by displaying these graphics successively.

On the one hand, when inputting the condition for changing the variable into the input unit, a processing command for repetition control and a repetition number are inputted into the input unit. Thereafter, it is suitable to generate the three-dimensional solid graphics as many number as the repetition number by executing processing for generating the graphics by the repetition number based on graphic data.

By employing the repetition control as described above, the graphic data can be processed repeatedly, and hence it is possible to suppress the amount of data lower when generating a plurality of the graphics successively. Further, by displaying the generated graphics successively, it becomes possible to express the solid with its shape changing and the movable solid.

On the other hand, when inputting the condition for changing the variable into the input unit, a processing command for conditional branch control and a condition for branching off processing are inputted into the input unit. Thereafter, it is suitable to generate the three-dimensional solid graphics while meeting the condition for branching off processing when generating the three-dimensional solid graphics in the arithmetic unit.

By employing the conditional branch control as described above, the graphic data can be processed by using the conditional branch, which makes it possible to suppress the amount of data lower when generating a plurality of the graphics successively, similarly to the aforementioned repetition control. Moreover, the generated graphics are displayed successively, thereby allowing the solid to be expressed with its shape changing and the movable solid to be expressed.

As described above, in the method for three-dimensional solid graphic generation according to one aspect of the present invention, the types of the graphics are limited to a small number of basic solids which are fundamental, and only a basic graphic command showing the basic solid and representative lengths of the basic solids are allowed to be designated as the graphic data.

That is, the basic solids comprise the graphics such as a cylinder, a cone, a cube, a polygon prism, a polygon pyramid, a rotary body and the like, and in the case of the cylinder and the cone, for example, the representative lengths such as the radius and the height are designated together with the basic graphic command. Accordingly, features of the solids are designated by two-dimensional coordinate data, and three-dimensional coordinate data such as a coordinate of a vertex is not directly designated in the above aspect of the present invention.

As this result, the amount of data of the file which relates to the graphic data showing the three-dimensional solid can be suppressed lower. It should be mentioned that the three-dimensional solid in complex form can be expressed by using these basic graphic commands in combination.

Further, the amount of data for describing the generation and the display of the three-dimensional solid can be suppressed further lower by using the variable, the repeat control and the conditional branch control. Furthermore, a command string by the simple description in a text file can be employed as the graphic data used in the method for three-dimensional solid graphic generation according to the above aspect of the present invention, and the solid can be expressed by the command strings.

Thus, when the method for three-dimensional solid graphic generation is executed based on the command strings, the simple command string in the text file is employed so that the graphics of the solid is simply generated every time it is executed, as well as easily generated successively while changing the shape of the solid graphics. Thereby, the expression of the solid with its shape changing from moment to moment and the expression of the solid movable in complex and successive manner are made possible, which are impossible by the conventional expressing form of the three-dimensional solid.

According to another aspect of the present invention, the record medium of the three-dimensional solid graphic generation is provided, in which a program readable by a computer is recorded for executing procedures for inputting the basic graphic command showing the type of the graphics and the variable showing the size of the graphics into the input unit as the graphic data and inputting the condition for changing the variable into the input unit, and a procedure for generating the three-dimensional solid graphics by changing the size of the graphics based on the condition for changing the variable to change the shape of the graphics in an arithmetic unit.

The following operational sequences are taken by the record medium of the three-dimensional solid graphic generation like this.

That is, according to this aspect, similarly to the above aspect of the present invention, the use of the variable makes it possible to suppress the amount of data lower when generating the graphics while changing the shape of the graphics successively. Moreover, the generated graphics are displayed successively, thereby allowing the solid to be expressed with its shape changing. Further, when the graphics are generated while moving the graphics and changing its shape successively, similarly to the above aspect of the present invention, it is also possible to suppress the amount of data lower. Furthermore, the movable solid can be expressed by displaying these graphics successively.

On the one hand, the procedure for inputting the condition for changing the variable into the input unit may be a procedure for inputting the processing command for the repetition control and the repetition number, and the procedure for generating the three-dimensional solid graphics in the arithmetic unit may be a procedure for generating as many three-dimensional solid graphics as the repetition number by executing processing for generating the graphics by the repetition number based on the graphic data.

Therefore, according this aspect, similarly to the above aspect, the graphic data can be processed repeatedly, which makes it possible to suppress the amount of data lower when generating a plurality of the graphics successively.

On the other hand, the procedure for inputting the condition for changing the variable into the input unit may be a procedure for inputting the processing command for the conditional branch control and the condition for branching off processing into the input unit, and the procedure for generating the three-dimensional solid graphics in the arithmetic unit may be a procedure for generating the three-dimensional solid graphics while meeting the condition for branching off processing.

Therefore, according to this aspect, the graphic data can be processed by using the conditional branch, which makes it possible to suppress the amount of data lower when generating a plurality of the graphics successively, similarly to the above aspect of the present invention.

As described above, in the record medium of three-dimensional solid graphic generation according to the another aspect of the present invention, similarly to the method for three-dimensional solid graphic generation of the above aspect of the present invention, the types of the graphics are limited to a small number of basic solids which are fundamental, and only the basic solid commands showing the basic solids and the representative lengths of the basic solids are allowed to be designated as the graphic data. Therefore, the amount of data of the file which relates to the graphic data showing the three-dimensional solid can be suppressed lower.

Further, the amount of data for describing the generation and the display of the three-dimensional solid can be suppressed further lower by using the variable, the repetition control and the conditional branch control. Also, similarly to the above aspect of the present invention, the expression of the solid with its shape changing and the expression of the movable solid are made possible by employing the simple command string in the text file as the graphic data.

DETAILED DESCRIPTION OF THE PREFERRED EMBODIMENTS

Hereinafter, a first embodiment of a method for three-dimensional solid graphic generation and a record medium of three-dimensional solid graphic generation according to the present invention will be explained with reference to the drawings.

Figure 1:
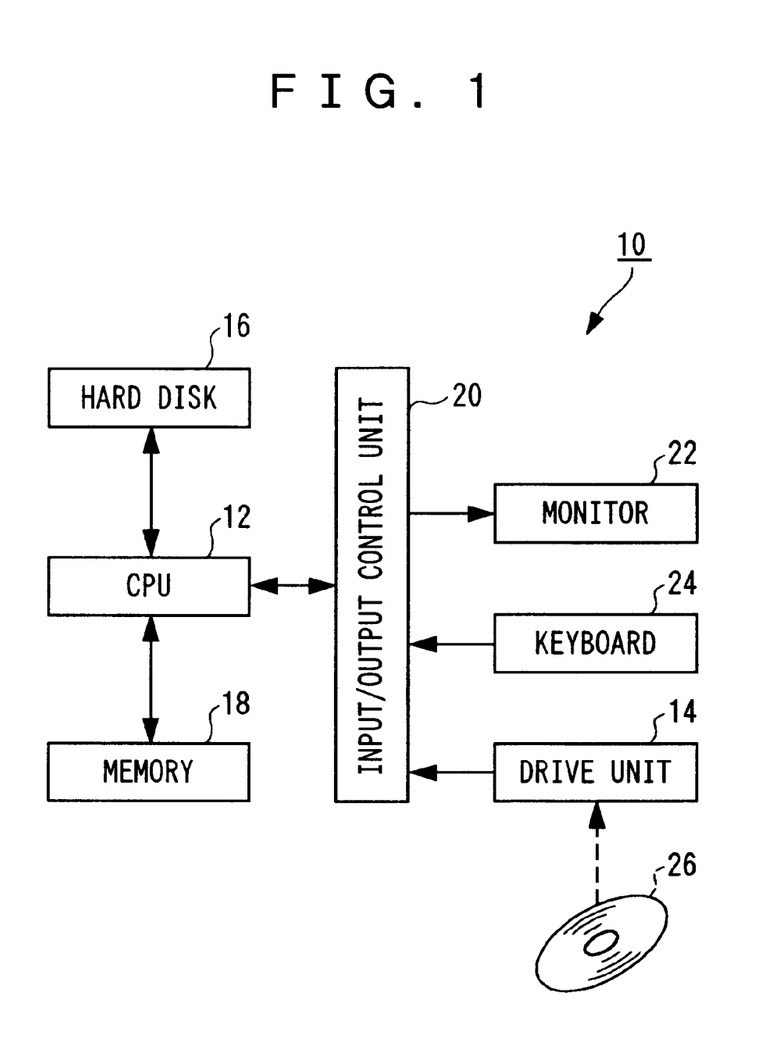
FIG. 1 is a block diagram showing a computer according to a first embodiment of the present invention.

A block diagram of a computer 10 as a three-dimensional solid graphic generating device according to this embodiment is shown in FIG. 1. The computer 10, as shown in the drawing, includes a CPU (Central Processing Unit) 12 as an arithmetic unit which is capable of executing programs such as generation and display of a three-dimensional solid, a drive unit 14 which is capable of reading data, the program and the like from the record mediums such as a CD-ROM 26 and a floppy disk, a hard disk 16 in which data, the program and the like read by the drive unit 14 are installed and stored, and a memory 18 such as RAM as a storage unit which is capable of inputting/outputting data and the like to/from the CPU 12, as basic components, respectively.

Further, the computer 10 has an input/output control unit 20 which controls the input/output of data and the like between the CPU 12 and the drive unit 14, and a monitor 22 as an output unit and a keyboard 24 as an input unit are also connected to the input/output control unit 20 which is connected to the CPU 12. This means that the monitor 22 and the keyboard 24 also comprise a part of the computer 10.

Figure 2:
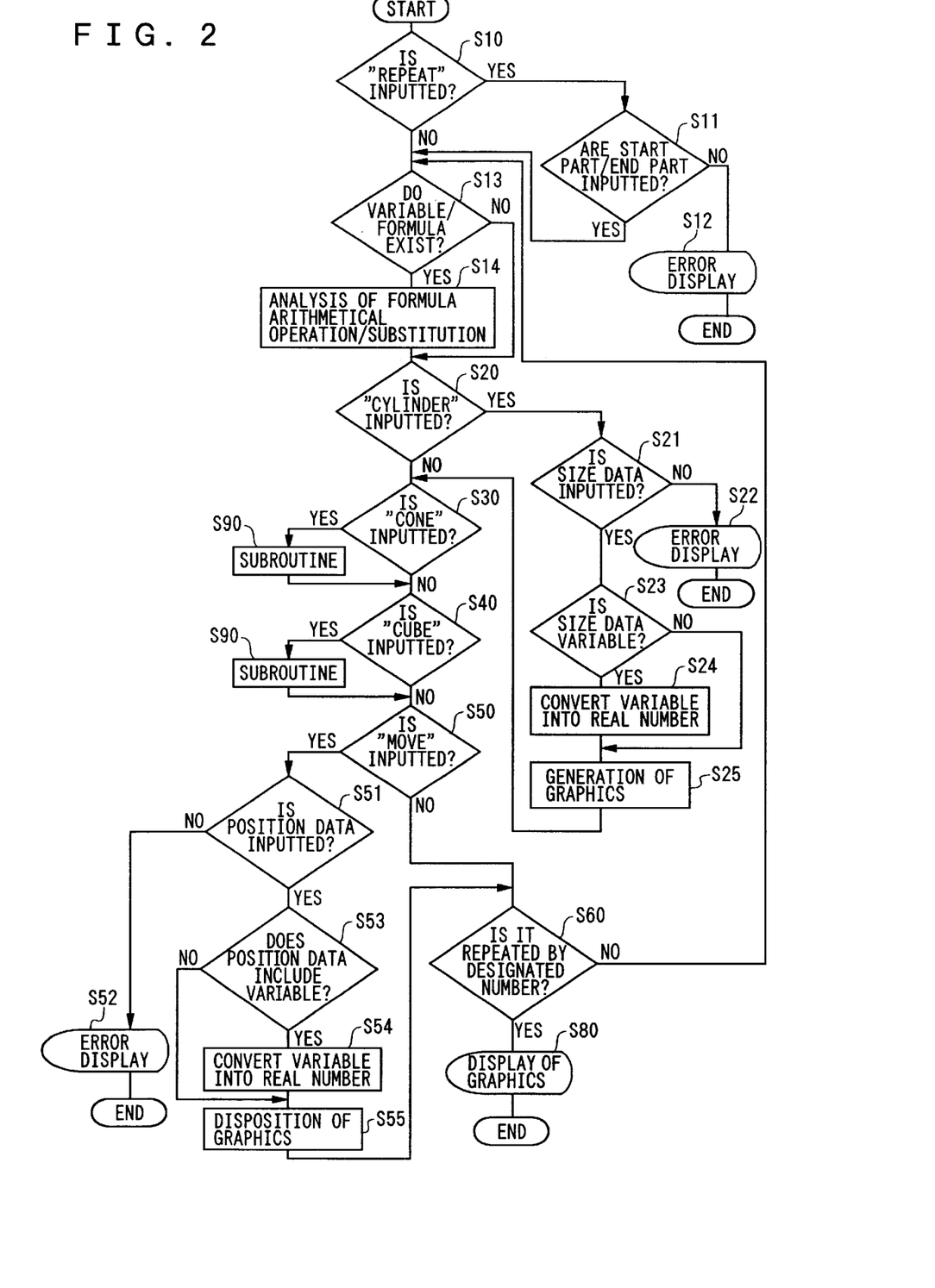
FIG. 2 is a view showing an execution flow of Example 1 according to the first embodiment of the present invention.
Figure 4:
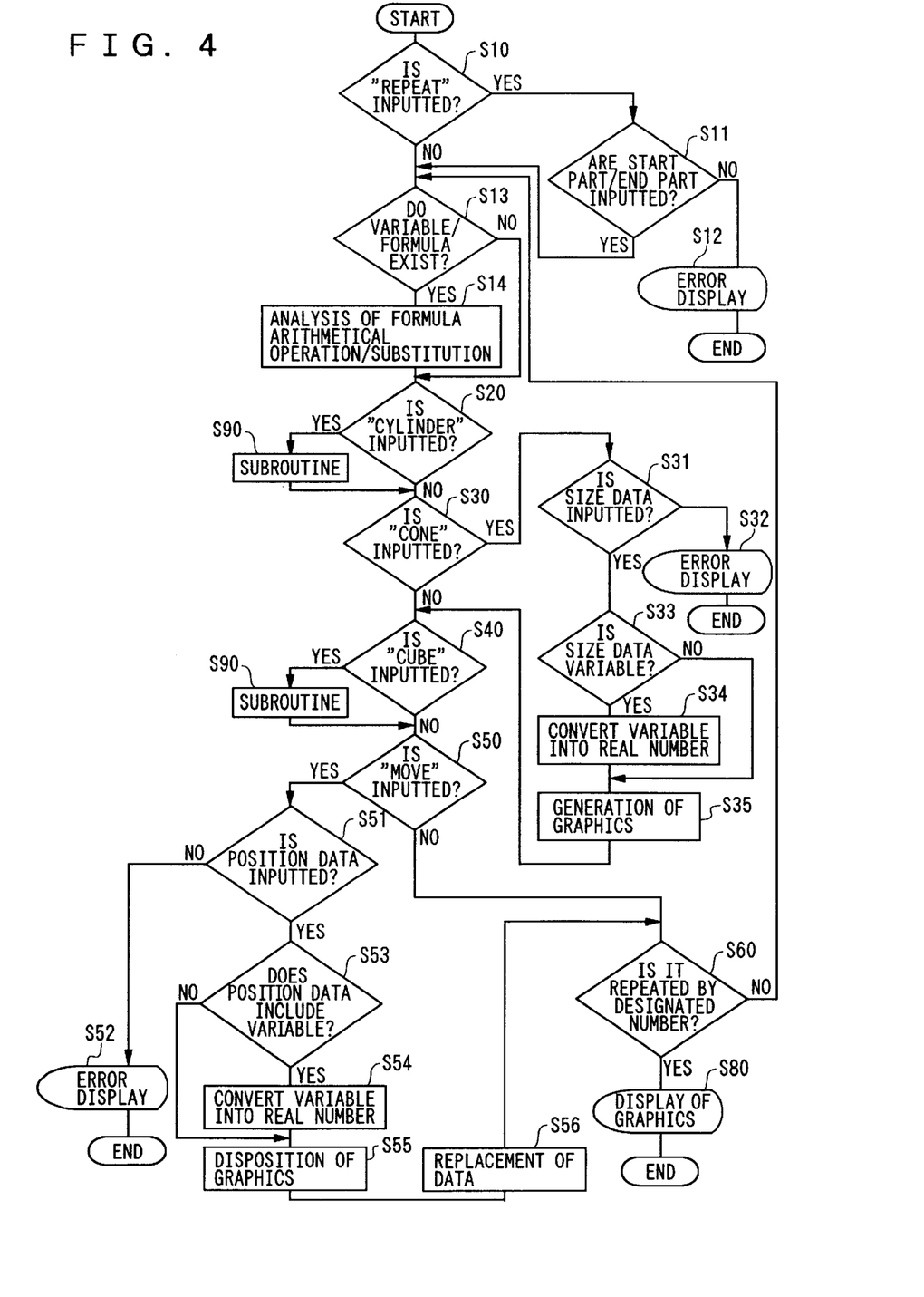
FIG. 4 is a view showing an execution flow of Example 2 according to the first embodiment of the present invention.
Figure 6:
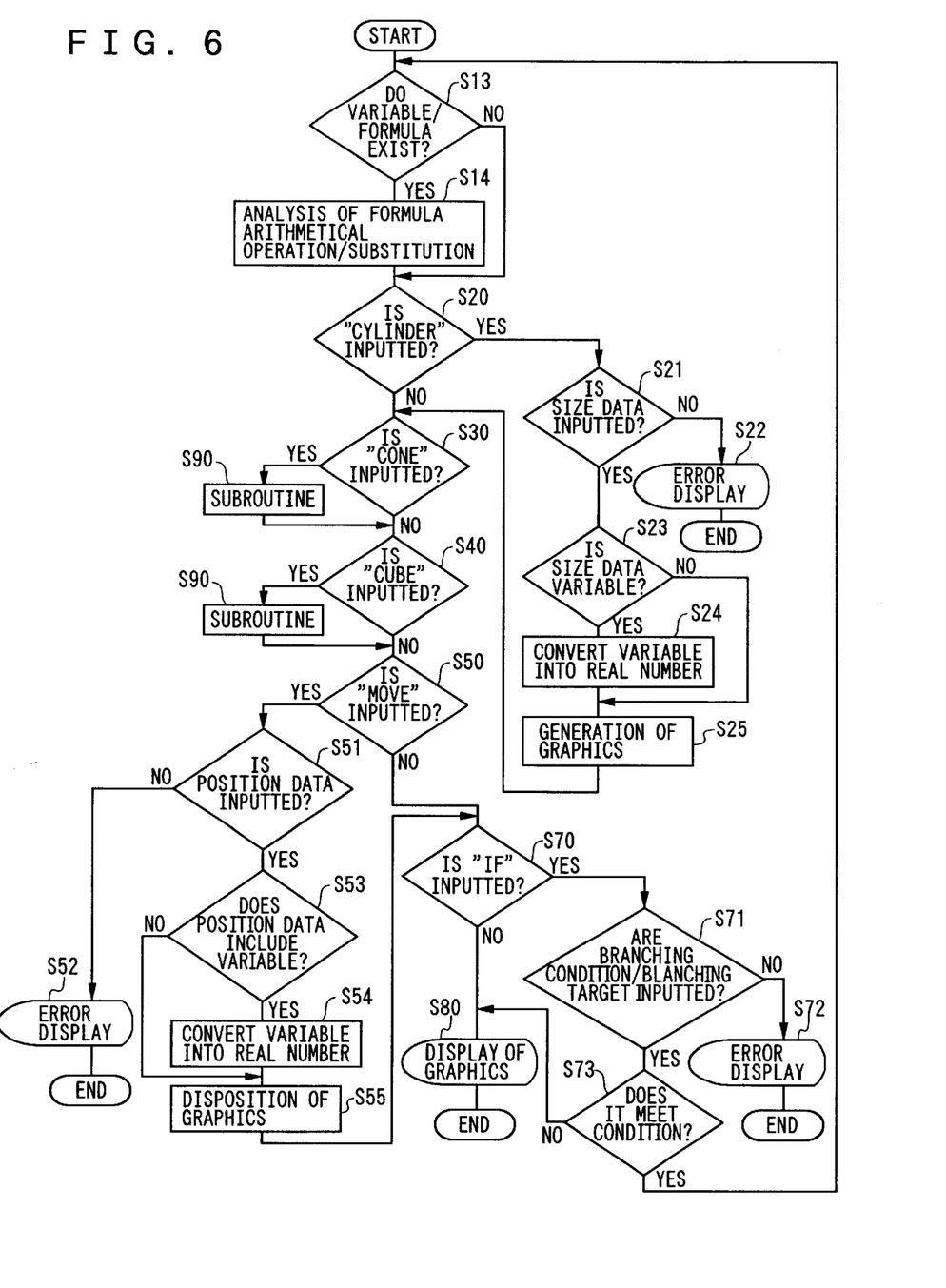
FIG. 6 is a view showing an execution flow of Example 3 according to the first embodiment of the present invention.

Meanwhile, software for the three-dimensional solid which is capable of generating and displaying the three-dimensional solid (its flow is shown in FIG. 2, FIG. 4 and FIG. 6) is recorded in the CD-ROM 26 as the record medium. When the drive unit 14 is put into operation with the CD-ROM 26 being loaded in the drive unit 14, the software for the three-dimensional solid is read by the drive unit 14 and installed in the hard disk 16 to be stored in this hard disk 16.

Thus, the drive unit 14 is not used thereafter, but it is possible to read out the software from the CD-ROM 26 every time the software is used. Incidentally, this software for the three-dimensional solid includes at least code for describing a solid, a program for analyzing the code to create a data structure of the solid, a program for displaying the solid on the monitor 22 and the like.

Next, operations of the generation and the display of the three-dimensional solid graphics according to this embodiment will be explained.

When a student as an executant of the software for the three-dimensional solid operates the computer 10 which is placed at school, a necessary part in the software is first read out from the hard disk 16 into the memory 18. Then, the software is made executable in the CPU 12 based on the contents read out into the memory 18.

That is, the code for describing the solid, the program for analyzing the code to create the data structure of the solid, the program for displaying the solid on the monitor 22 which are read out from the hard disk 16 exist in the memory 18 at this moment.

Command groups of Example 1 as will be described later are inputted from the keyboard 24 under a condition in which the software is executable.

Following the input, the commands are transmitted to the monitor 22 via the input/output control unit 20, and the monitor 22 displays the commands.

Namely, "Repeat" as a processing command of repetition control, "5" as a repetition number, a start part and an end part of a repetition range, "Cylinder" as a basic graphic command which means a cylinder out of various graphics, a variable showing a size of the cylinder, an initial value of the variable, a formula for changing the variable and so on are inputted in text files from the keyboard 24.

EXAMPLE 1

```
H=2; R=12; M=10
Group XX0 {
    Repeat 5 {
        Cylinder Cy% R, H
        Move Cy% 0, M, 0
        R=R-2; H=H+2; M=M+R
    }
}
Display Group XX0
```

By pressing a return key of the keyboard 24, the aforementioned command groups are inputted in the CPU 12 via the input/output control unit 20 and the execution of the software for the three-dimensional solid is started as shown in FIG. 2 so that each command string is processed in the CPU 12 of the computer 10.

When this processing is started, it is first decided whether "Repeat" as the processing command of the repetition control is inputted or not in a step S10, and if it is not inputted, processing continues by moving to a next step S13. However, in this example, since the decision can be made that "Repeat" is inputted in the step S10, it is decided whether the start part and the end part which show the range of the repetition control are inputted or not in a step S11. In other words, it is decided whether "{" as a command of the start part and "}" as a command of the end part are inputted in the command groups or not.

If at least any of these commands is lacking, an error indication is made on the monitor 22 and processing is terminated in a step S12, and it will be in an input stand-by state from the keyboard 24. However, in this example, since the start part and the end part are inputted, it is moved to the step S13 to decide whether the variable and the formula using the variable exist or not. Incidentally, it is decided whether a command of one uppercase alphabetic character exists or not because the variable is made by one uppercase alphabetic character.

In this example, the decision can be made that "R, H, M" as the commands of the variables and "R=R−2; H=H+2; M=M+R" as the commands of the formulas using the variables exist in the step S13. Therefore, analysis of the formulas and arithmetical operation and substitution of the variables are executed in a step S14 to convert the variables into real numbers which are integral, and thereafter, it is moved to a step S20. It should be noted that, when the decision is made that the variable and the formula using the variable do not exist in the step S13, it is moved directly to the step S20.

In the step S20, a type of the graphics is decided, and when "Cylinder" is not inputted, it is successively moved to a step S30 and a step S40 to be decided whether the basic graphic command which shows another type of the graphics such as "Cone" as a cone, "Cube" as a cube or the like is inputted or not in due order. Further, subroutines S90 for generating the graphics are provided corresponding to the respective types of the graphics such as "Cone", "Cube" or the like.

In this example, since "Cylinder" is inputted as the basic graphic command, it is moved to a step S21 to be decided whether size data of a radius and a height of the cylinder is inputted or not. In this case, a variable "R" as the radius and a variable "H" as the height are inputted as the size data, respectively, and hence it is moved to a step S23. It should be noted that, when the size data is not inputted, the error indication is made on the monitor 22 and processing is terminated in a step S22, and it will be in the input stand-by state from the keyboard 24.

In the step S23, it is decided whether the size data is inputted as the variable or not, and when the decision is made that it is the variable, the variable is converted into the real number in a step S24, which is determined in the step S14 based on the commands of the formulas "R=R−2; H=H+2" in the CPU 12. Moreover, in a step 25, an area as an outer peripheral plane of the cylinder is divided into 16 so that the outer peripheral plane consists of 16 planes, under which situation data of each plane, a vertex and a ridge which comprise this graphics is generated and the graphics of the generated data is named as "Cy%". Incidentally, since % in its name is converted to the repetition number, the name of the graphics which is first generated becomes "Cy1".

Subsequently, the decisions in the step S30 and the step S40 are made, but the command showing the cone or the cube is not inputted in this example. Therefore, it is moved to a step S50 in which it is decided whether "Move" as a processing command for moving the graphics and determining a position of the graphics exists or not. When "Move" exists, it is decided whether position data is inputted or not in a following step S51.

In this case, it is moved to a step S53 because the position data is inputted. It should be noted that, when the position data is not inputted, the error indication is made on the monitor 22 and processing is terminated in a step S52, and it will be in the input stand-by state from the keyboard 24.

In the step S53, it is decided whether the inputted position data includes the variable or not, and when it is decided to include the variable, the variable is converted into a real number based on the command of the formula "M=M+R" in a step S54 and thereafter, the position of the graphics on an X-axis, a Y-axis and a Z-axis which are three-dimensional coordinates and orthogonal to each other is determined.

Further, in this example, since it is described as "Cy% 0, M, 0" after "Move", the graphics which corresponds to the data of the graphics named Cy1 is disposed at a position of 0 on the X-axis and the Z-axis, and of a variable M on the Y-axis in a step S55. Here, the variable M becomes 22 because of the initial value "R=12; M=10" and the formula "M=M+R".

Thereafter, it is moved from a position in the command group which includes "}" as the command of the end part of the repetition control to a position in the command group which includes "{" as the command of the start part to continue processing. In other words, when the commands in the range from the start part to the end part of the repetition control are executed, it is returned to the start part to execute the commands from the start part to the end part again.

On this occasion, it is decided in a step S60 whether processing is repeated by the designated number of the repetition control in the CPU 12 so that this repetition control is executed 5 times as the designated number to generate the five graphics, and the positions of the graphics corresponding to these graphics are designated. As this result, a processing command of a group structure "Group XX0" which is disposed at a position outside the repetition control and processing inside commands "{" and "}" which show the range of this processing command complete, and hence it is moved to a step S80.

Figure 3:
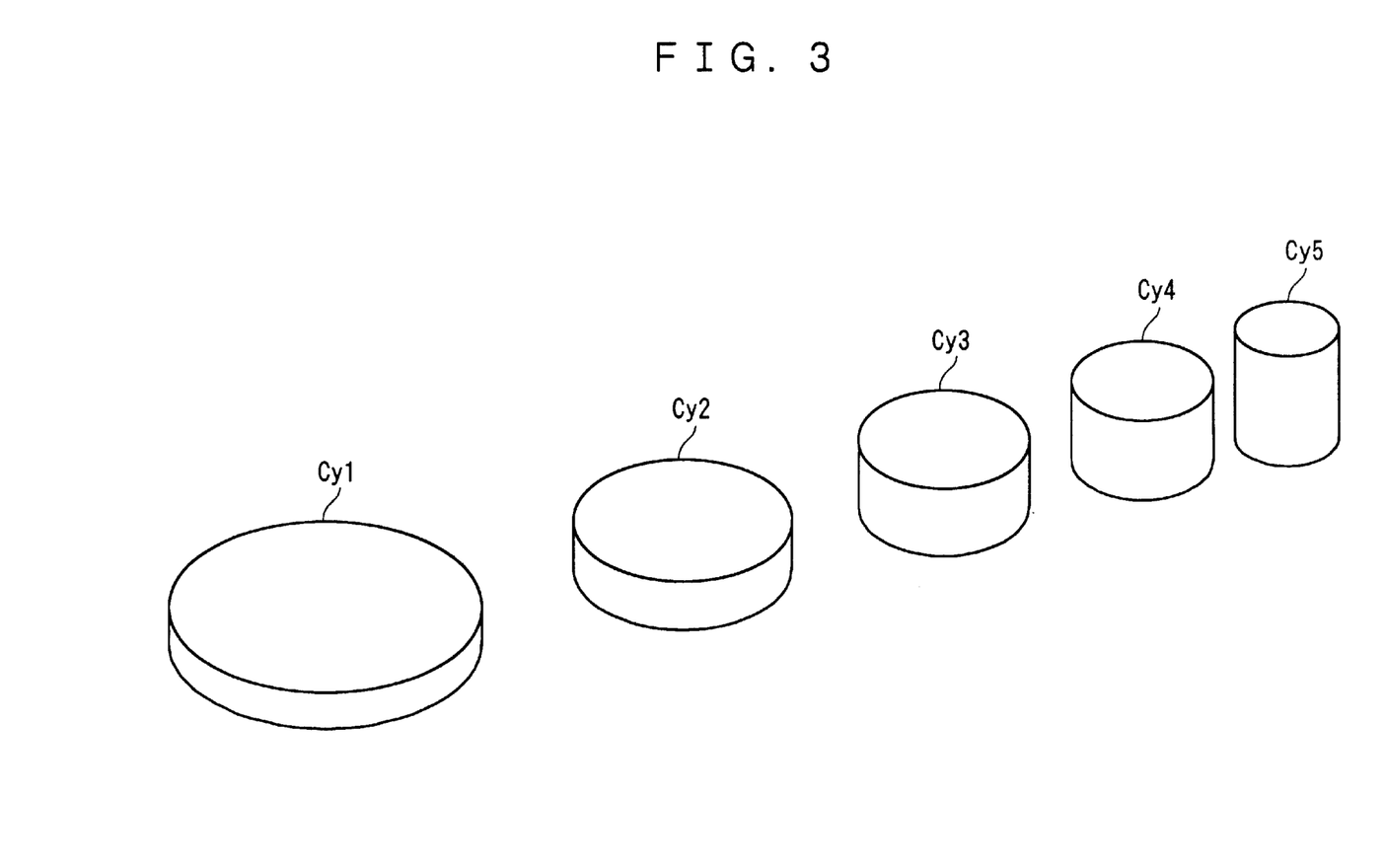
FIG. 3 is a view showing cylinders generated by the execution flow of Example 1 according to the first embodiment of the present invention.

The above completes the generation of the group structure "Group XX0" in which the five cylinders named respectively Cy1, Cy2, Cy3, Cy4, Cy5 are arranged on the Y-axis. Further, in the step S80, the graphics in which the five cylinders in the group structure "Group XX0" are arranged on the Y-axis is displayed on the monitor 22 as shown in FIG. 3.

Next, a case of generating graphics with a plurality of cones overlapping one another by using the repetition control similarly to the above will be explained.

In this case, command groups of Example 2 as will be described later are also inputted from the keyboard 24 under a condition in which the software for the three-dimensional solid is executable. Following the input, the commands are transmitted to the monitor 22 via the input/output control unit 20, and the monitor 22 displays the commands.

Namely, "Repeat" as the processing command of the repetition control, "C=5" as the repetition number, the start part and the end part of the repetition range, "Cone" as the basic graphic command which means the cone out of the various graphics, a variable showing a size of the cone, an initial value of the variable, a formula for changing the variable and so on are inputted in text files from the keyboard 24.

Further, in this example, a color of the cone when it is displayed on the monitor 22 is designated by inputting. Furthermore, as a slant area of the cone needs to be in a divided form, "N" showing a number of the divided planes is designated by inputting. Incidentally, "N" is not necessarily designated and the slant of the cone is displayed with a predetermined number of the planes when it is not designated.

Meanwhile, in this example, the cones which are repeatedly generated and brought together are regarded as a single solid graphics, and "Body" as a name of this single solid graphics and an initial condition of this solid graphics are designated by being inputted from the keyboard 24.

EXAMPLE 2

```
N=12; R=10; H=22
Cone Body N, R, H
Xcolor Body 1, 1, 1
C=5
    Repeat C {
        R=R-1; H=H-4;
        M=%*8
        Cone Co% N, R, H
        Move Co% 0, M, 0
        Body=Body+Co%
    }
Display eye0 Body
```

By pressing the return key of the keyboard 24, the aforementioned command groups are inputted in the CPU 12 via the input/output control unit 20 and the execution of the software for the three-dimensional solid is started as shown in FIG. 4 so that each command string is processed in the CPU 12 of the computer 10.

When this processing is started, it is first decided whether "Repeat" as the processing command of the repetition control is inputted or not in a step S10, and if it is not inputted, processing continues by moving to a next step S13. However, also in this example, since the decision can be made that "Repeat" is inputted in the step S10, it is decided whether the start part and the end part showing the range of the repetition control are inputted or not in a step S11, similarly to Example 1.

If at least any of these commands is lacking, the error indication is made on the monitor 22 and processing is terminated in a step S12, and it will be in the input stand-by state from the keyboard 24. However, also in this example, since the start part and the end part are inputted, it is moved to the step S13 to decide whether the variable and the formula using the variable exist or not, similarly to Example 1.

In this example, the decision can be made that "R, H, M" as the commands of the variables and "R=R-1; H=H-4; M=%*8" as the commands of the formulas using the variables exist in the step S13. Therefore, analysis of the formulas and arithmetical operation and substitution of the variables are executed to convert the variables into the real numbers which are integral in a step S14 and thereafter, it is moved to a next step. It should be noted that, when the decision is made that the variable and the formula using the variable do not exist in the step S13, it is moved directly to the next step.

Namely, in a step S20 as the next step, it is decided whether "Cylinder" is inputted or not. After the step S20, it is decided whether "Cone" as the cone is inputted or not in a step S30, and whether "Cube" as the cube is inputted or not in a step S40 in due order, as in Example 1.

In this example, since the command showing the cylinder is not inputted, a subroutine S90 in FIG. 4 which is processing from a step S21 to a step S25 as shown in Example 1 is not executed.

Therefore, it is moved from the step S20 to the step S30 and it is decided in the step S30 to move to a step S31 since "Cone" is inputted as the basic graphic command. Then, from the step S31 to a step S35 which are processing in the subroutine S90 of Example 1 are successively executed.

In concrete, it is decided whether size data of a radius and a height of the cone is inputted or not in the step S31. In this case, a variable "R" as the radius and a variable "H" as the height are respectively inputted as the size data, and hence it is moved to a step S33. It should be noted that, when the size data is not inputted, the error indication is made on the monitor 22 and processing is terminated in a step S32, and it will be in the input stand-by state from the keyboard 24, similarly to Example 1.

In the step S33, it is decided whether the size data is inputted as the variable or not, and when the decision is made that it is the variable, the variable is converted into the real number in a step S34, which is determined in the step S14 based on the commands of the formulas "R=R−1; H=H−4" in the CPU 12.

Moreover, in the step S35, a slant area of the cone is divided into 12 so that the slant consists of 12 planes, under which situation data of each plane, a vertex and a ridge which comprise the graphics is generated and the graphics of this generated data is named as "Co%". Incidentally, since % in its name is converted to the repetition number, the name of the graphics which is first generated becomes "Co1".

Subsequently, it is decided whether the command showing the cube exists or not in the step S40, but the command showing the cube is not inputted in this example. Therefore, it is moved to a step S50 in which it is decided whether "Move" as the processing command for moving the graphics and determining a position of the graphics exists or not. It is decided in a step S51 and moved to a step S53 similarly to Example 1.

In the step S53, it is decided whether the inputted position data includes the variable or not, and when it is decided to include the variable, the variable is converted into a real number based on the command of the formula "M=%*8" in a step S54, and then, the position of the graphics on the X-axis, the Y-axis and the Z-axis which are three-dimensional coordinates and orthogonal to each other is determined. Thereafter, the graphics is disposed in a step S55.

In this example, since it is described as "Co% 0, M, 0" after "Move", the graphics which corresponds to the data of the graphics named Co1 is disposed at a position of 0 on the X-axis and the Z-axis, and of the variable M on the Y-axis. Here, the variable becomes 8 because of "%" which is 1 and the formula "M=%*8".

Further, in this example, it is moved to a step S56, where, from the formula of "Body=Body+Co%", the above data of Co1 is added to "Body" which is the name of the solid graphics to replace "Body".

Thereafter, it is moved from a position in the command group which includes "}" as the command of the end part of the repetition control to a position in the command group which includes "{" as the command of the start part to continue processing. In other words, when the commands in the range from the start part to the end part of the repetition control are executed, it is returned to the start part to execute the commands from the start part to the end part again.

On this occasion, it is decided in a step S60 whether processing is repeated by the designated number of the repetition control in the CPU 12 so that this repetition control is executed 5 times as the designated number to generate the five graphics, and the positions of the graphics corresponding to these graphics are designated.

It should be noted that, in this example, the cone which is previously formed as an initial condition of Body and the five generated graphics are regarded as an integral solid graphics with each part thereof overlapping one another, from a relationship of a value of the variable "R" as the radius of the cone and a value of the variable "M" showing its position on the Y-axis.

Figure 5:
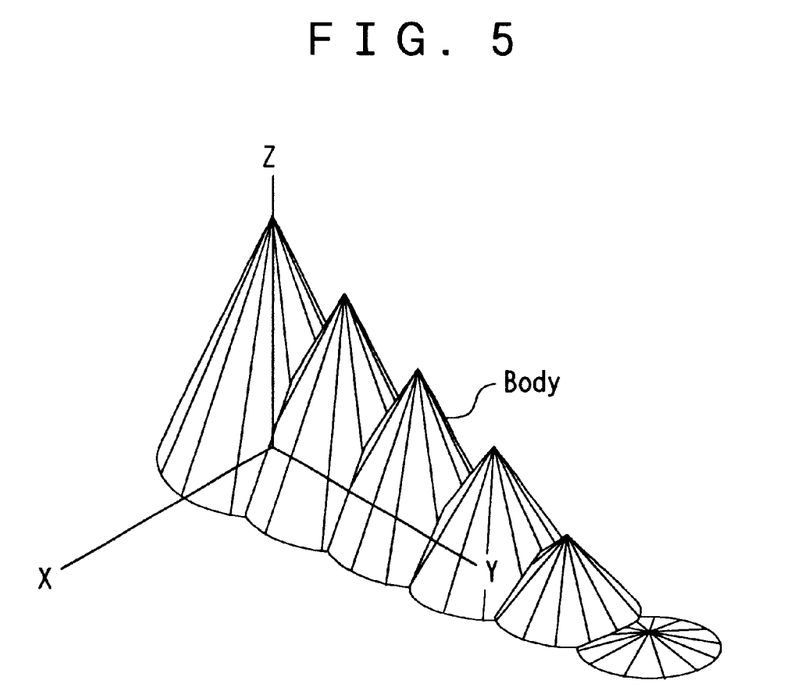
FIG. 5 is a view showing cones generated by the execution flow of Example 2 according to the first embodiment of the present invention.

The above completes the generation of the structure "Body" in which the cone shape of the initial condition of Body and the five cones named respectively Co1, Co2, Co3, Co4, Co5 are arranged on the Y-axis with each part overlapping one another. Thereafter, it is moved to a step S80 to execute a processing command "Display eye0 Body" which is disposed outside the repetition control. That is, the graphics with the six cones which comprising the solid graphics "Body" which are arranged on the Y-axis is displayed on the monitor 22 in a previously designated color, as shown in FIG. 5.

Next, a case of generating a graphics which is similar to Example 1 using conditional branch control will be explained.

In this case, command groups of Example 3 as will be described later are also inputted from the keyboard 24 under the condition in which the software for the three-dimensional solid is executable. Following the input, the commands are transmitted to the monitor 22 via the input/output control unit 20, and the monitor 22 displays the commands.

Namely, instead of the repetition control, a command string using "If" which is a processing command of the conditional branch control and "Loop1", "Loop2" which are commands of moving targets in the conditional branch are respectively inputted in this example. Other commands are the same with those of Example 1, which are inputted from the keyboard 24.

EXAMPLE 3

```
H=2; R=12; M=10
Group XX0 {
    Loop 1:
        Cylinder Cy% R, H
        Move Cy% 0, M, 0
        R=R-2; H=H+2; M=M+R
        If H<10 Then GoTo Loop1 Else Goto Loop2
    Loop2:
}
Display Group XX0
```

When this processing is started, it is processed similarly to Example 1 to generate first graphic data and designate a position of the graphics, although processing from the step S10 to the step S12 are missing.

Subsequently, as shown in FIG. 6, it is decided whether "If" which is the processing command of the conditional branch control is inputted or not in a step S70, and if it is not inputted, it is moved to a following step S80 to continue processing and complete by displaying one graphics.

In this example, since the decision can be made that "If" is inputted in the step S70, it is decided in a step S71 whether a branching condition and a blanching target of the conditional branch control are inputted or not. In other words, it is decided whether the branching condition is set up after "If" or not and whether "Loop1", "Loop2" as the commands of the branching target are inputted in the command groups or not.

If at least any of these commands is lacking, the error indication is made on the monitor 22 and processing is terminated in a step S72, and it will be in the input stand-by state from the keyboard 24. However, in this example, since the blanching condition and the blanching target are inputted, it is moved to a step S73 to decide whether it meets the branching condition or not.

That is, it is decided in the step S73 whether it meets H<10 as the branching condition of the conditional branch control in the CPU 12, and when the condition is met, "Goto Loop1" following "Then" in the command string of the conditional branch control is executed to continue processing by moving to a position of "Loop1" in the command groups. If the condition is not met, "Goto Loop2" following "Else" is executed to continue processing by moving to a position of "Loop2" in the command groups.

As described thus far, processing from "Loop1" to the conditional branch control is repeated until it does not meet H<10 as the branching condition of the conditional branch control.

Meanwhile, when the above processing is repeated to generate the graphics of necessary numbers (in this example, 5) and to designate positions of the graphics, the condition of H<10 is not met, and hence it is moved to processing following "Loop2".

Further, similarly to Example 1, in the step S80, the graphics in which the five cylinders in the group structure "Group XX0" are arranged on the Y-axis is displayed on the monitor 22 as shown in FIG. 3.

Incidentally, when this conditional branch control is used, it is also suitable to make it as later-described Example 4. In this example, a variable "N" and a formula using the variable "N=N+1" are added thereto and it is determined whether the variable matches the branching condition or not.

EXAMPLE 4

---

H=2; R=12; M=10; N=0
Group XX0 {
    Loop 1:
        Cylinder Cy% R, H
        Move Cy% 0, M, 0
        R=R−2; H=H+2; M=M+R; N=N+1
        If N<5 Then Goto Loop1 Else Goto Loop2
    Loop2:
}
Display Group XX0

---

Figure 7:
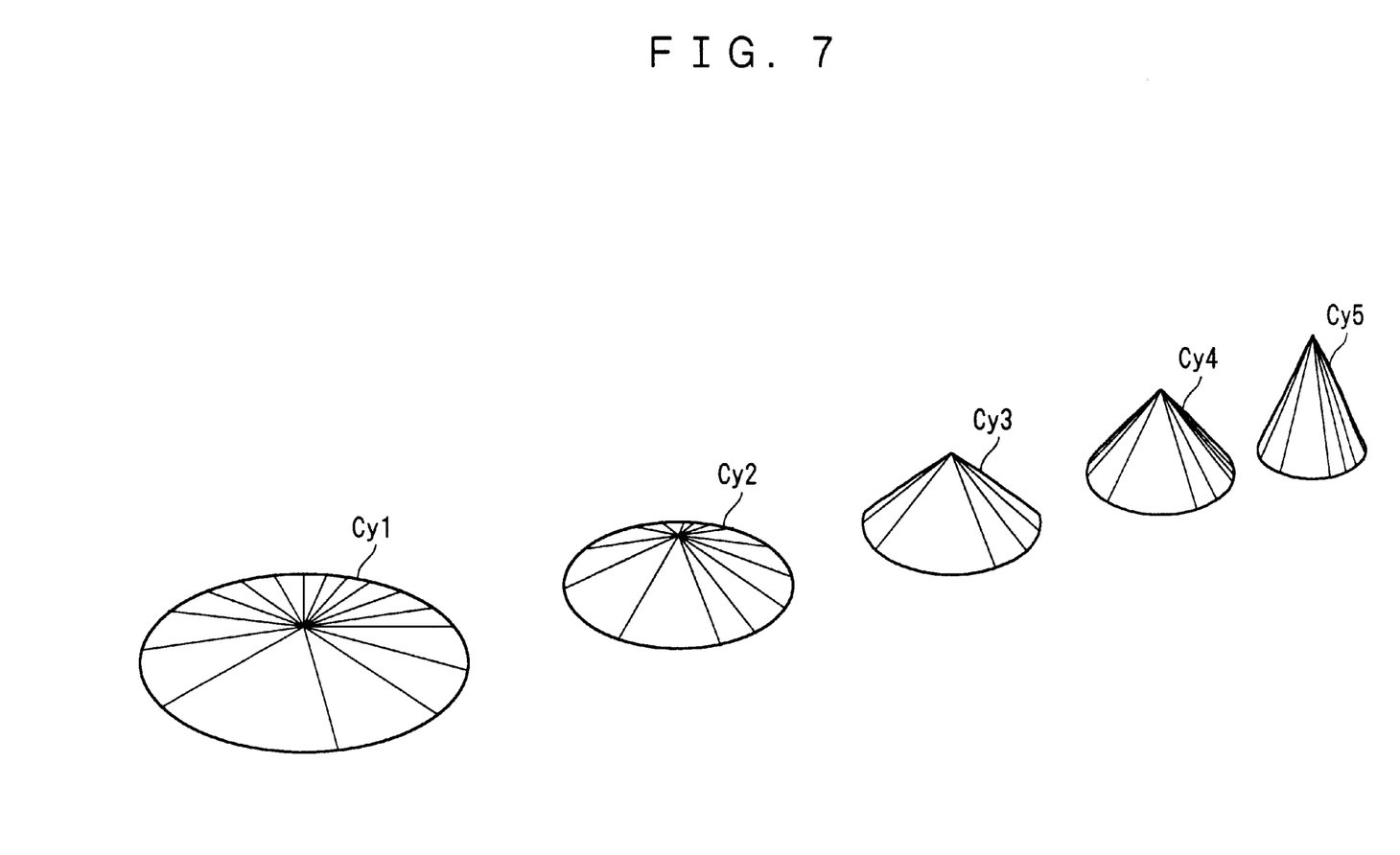
FIG. 7 is a view showing cones generated by the execution flow according to the first embodiment of the present invention.

Further, when, for example, "Cone" as the cone is inputted instead of aforementioned "Cylinder", the graphics which takes the form of the five cones being arranged as shown in FIG. 7 is displayed on the monitor 22.

Thus, according to Example 1 of this embodiment, the variables are used by the description of the simple command groups and the graphic data is repeatedly processed, which makes it possible to suppress the amount of the data lower when generating a plurality of the graphics successively while changing the shape of the graphics successively. Moreover, the generated graphics are displayed successively, thereby allowing the solid to be expressed with its shape changing.

Further, as shown in Example 1, when the graphics are generated while moving and changing its shape successively, it is also possible to suppress the amount of the data lower. Furthermore, a movable solid can be expressed by, for example, displaying these graphics successively.

Meanwhile, according to Example 3 and Example 4 of this embodiment, the variables are used by the description of the simple command groups and the graphic data is processed by the conditional branch. As this result, it is possible to suppress the amount of the data lower when generating a plurality of the graphics successively as in Example 1, and by displaying the generated graphics successively, it is also possible to express the solid with its shape changing, and to express the solid movably.

Namely, the amount of the data for describing the generation and the display of the three-dimensional solid graphics can be suppressed further lower by using the variable, the repetition control and the conditional branch control as in Example 1 to Example 4 of this embodiment. Further, the solid can be easily expressed by the command string because the command string by the simple description in a text file can be employed as the graphic data which is employed in this embodiment.

Thus, since the simple command string of the text file is employed, not only the graphics of the solid is simply generated every time it is executed, but the expression of the solid with its shape changing from moment to moment and the expression of the solid movable in complex and successive manner are easily made possible, which are impossible by the conventional expressing form of the three-dimensional solid.

Moreover, in this embodiment, the types of the graphics are limited to a small number of basic solids which are fundamental, and only the basic graphic commands showing the basic solids and the representative lengths of the basic solids are allowed to be designated as the graphic data.

That is, the basic solids are the graphics such as the cylinder, the cone, the cube and the like in this embodiment, and in the case of the cylinder and the cube, for example, the representative lengths such as the radius and the height are designated together with the basic graphic command to designate a feature of the solid by two-dimensional coordinate data. Accordingly, in this embodiment, three-dimensional coordinate data such as a coordinate of the vertex is not directly designated.

Therefore, the amount of the data of the file which relates to the graphic data showing the three-dimensional solid can be suppressed lower. It should be mentioned that the three-dimensional solid in complex form can be expressed by using these basic graphic commands in combination.

As examples of the basic solids and the basic graphic commands thereof, the graphics of the following 10 types are conceivable.

| | |
|---|---|
| Cone | Generation of cone . . . generate conical solid |
| Cube | Generation of cube . . . generate cube |
| Cylinder | Generation of cylinder . . . generate cylindrical solid |
| Ellipse | Generation of rotary elliptical body . . . generate rotary elliptical body |
| Line | Generation of linear component . . . generate linear component |
| Prism | Generation of polygon prism . . . generate polygon prism |
| Pyramid | Generation of polygon pyramid . . . generate polygon pyramid |
| Revolve | Generation of rotary body . . . generate rotary body of section of two-dimensional polygon |
| Sphere | Generation of sphere . . . generate sphere |
| Torus | Generation of torus . . . generate torus |

As described above, in the flowcharts as shown in FIG. 2, FIG. 4 and FIG. 6, it is suitable to determine whether the aforementioned seven basic graphic commands from "Ellipse" and below exist or not, other than "Cylinder", "Cone" and "Cube".

Next, the command names of arithmetic and the functions thereof which are used in combination with the basic graphic commands when expressing the three-dimensional solid in complex form are explained as follows.

Group 2=Group 1: copy solid in Group 1 to Group 2
Solid 2=Solid 1: copy Solid 1 to Solid 2
Solid 3=Solid 1+Solid 2: copy sum set of Solid 1 and Solid 2 to Solid 3
Solid 3=Solid 1−Solid 2: copy differential solid between Solid 1 and Solid 2 to Solid 3
Solid 3=Solid 1*Solid 2: copy product set of Solid 1 and Solid 2 to Solid 3
Solid 2=Solid 1*Variable or Constant: enlarge solid by variable times (with its center of gravity being center thereof)
Solid 2=Solid 1/Variable or Constant: reduce solid by variable times (with its center of gravity being center thereof)
Variable X=Variable or Constant Y (OP) Variable or Constant Z: (OP) are four types of +, −, *, and /

The followings are operational commands to the solid or the group. =, +, −, * substitution, sum, difference, product arithmetic . . . copy of solid, group, set arithmetic operation of solid

| | |
|---|---|
| Affine | Affine transformation . . . perform affine transformation to designated solid |
| Delete | Delete . . . delete solid, group and the like |
| Axis | Axis setting . . . generate, set, change axis in rotating, moving in parallel |
| Group | Generation of group . . . generate, move group, insert solid and the like |
| Move | Parallel movement . . . move solid and group in parallel |
| Ncopy | Multiple copy . . . copy solid and group by multiple numbers |
| Rename | Change of name . . . change names of solid, group and the like |
| Rotate | Rotating movement . . . rotating movement of solid and group |
| Color | Ridge color setting . . . set display colors (16 colors) of solid and group |
| Fcolor | Plane color setting . . . set surface color of solid and group |
| Xcolor | Ridge color setting . . . set display colors and tiling of solid and group |
| Property | Shape characteristic setting . . . set characteristics of plane, vertex and ridge of solid and group |

Further, other commands are as follows.

| | |
|---|---|
| # | Designation of comment line . . . designate comment line (line which is not executed) |
| Eye | Sight setting . . . generate and change sight information (visual point, noticed visual point, display mode) |
| Clear | Clearing display . . . clear display screen |
| Dispcord | Display coordinate axis/mesh . . . display coordinate axis |
| Display | Solid display . . . display solid and group |
| End | End . . . end execution of command |
| Include | Execution of file . . . load and execute file |
| New | Initialization of solid data . . . delete/initialize data of solid, group and axis |
| SaveCAD | Generation of CAD file . . . generate CAD file of solid and group |
| LoadCAD | Load CAD file . . . load CAD file |
| Save | Saving solid data . . . generate data file of solid and group |
| Load | Load solid data . . . load data file of solid and group |
| Mwait | Wait for millisecond . . . wait of designated count for millisecond |
| Wait | Wait for second . . . wait of designated count by second |
| Window | Window . . . set display area |
| Repeat | Repeat . . . set repetition control |
| If-Then-Else | Conditional branch . . . set conditional branch control |
| Goto | Jump . . . change position of execution |

As described above, according to the expressing form of the present invention, the solid, the group, the axis and so on are generated, named and controlled, and additionally, movement, rotation, transformation and so on can be designated by the variable. Moreover, not only the set arithmetic operation between the solids, but also the four fundamental operations between the variables and between the variable and the constant can be performed, and further, the shape of the solid can be designated and the range of movement can be designated based on the results of the operations.

Next, a second embodiment of the present invention will be explained with reference to FIG. 8. Incidentally, the same numerals are given to the members which are the same members with those explained in the first embodiment in order to omit the overlapping explanation.

Figure 8:
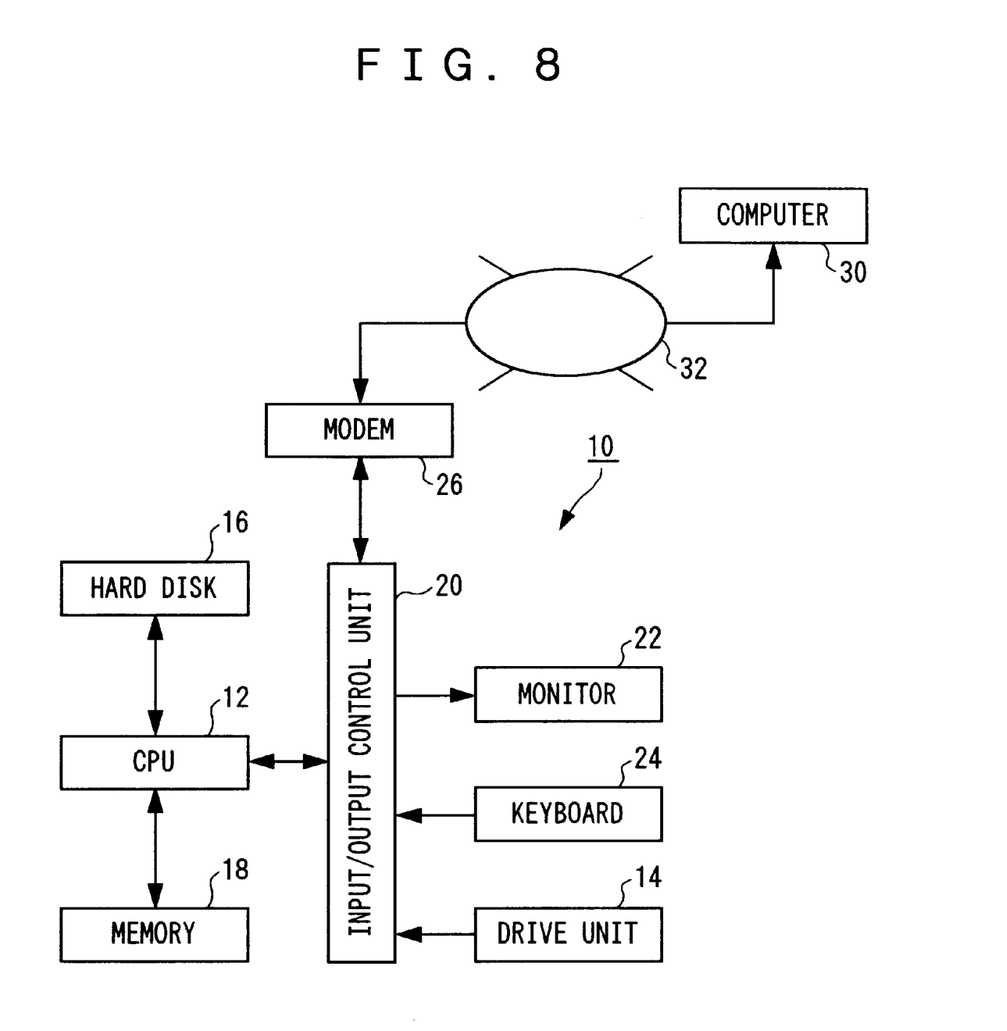
FIG. 8 is a conceptual block diagram of a three-dimensional solid graphic generating device according to a second embodiment of the present invention.

A conceptual block diagram of a three-dimensional solid graphic generating device according to this embodiment is shown in FIG. 8.

A computer 30 of a sender side, as shown in the drawing, includes a not-shown keyboard and modem which are capable of making a command in a text file and sending it out.

A computer 10 used by a student as a user includes a modem 26 and a plug-in program as software for a three-dimensional solid which is capable of generating a three-dimensional solid graphics. Further, the computer 10 used by the student is allowed to be connected to the computer 30 of the sender side by a telephone line either via the Internet 32 or directly.

Incidentally, mail software which allows data and the like to be transmitted between the computer 10 of the student side and the computer 30 of the sender side is installed in the computers 10, 30.

Next, an executing operation of generation and display of the three-dimensional solid graphics according to this embodiment will be explained.

When the student as an executant of the software for the three-dimensional solid connects, for example, into the Internet 32 from the computer 10 of his/her own, a file in a text file in which graphic data of the three-dimensional solid is described is transmitted from the computer 30 of the sender side. Further, the three-dimensional solid graphics is actually generated by the plug-in program which is the program already installed in the computer 10 of a client side.

When the description of the graphic data of the three-dimensional solid is transmitted via the Internet 32 or the like, the file in the text file which has a less data amount is transmitted, which is decoded by the computer 10 and the structure of the solid is constructed. Therefore, it is made possible to construct the structure of the solid while decreasing the load of transmission even at a distant location.

This method is the same technique with the other transmission of a file concerning the three-dimensional solid graphics such as VRML format, but this embodiment has a difference in which the plug-in program in the computer 10 can decode the variable, the structure of the repetition control and the structure of the conditional branch control, in addition to parametric representation of the solid similarly to the first embodiment.

Incidentally, as the drive unit of the present invention, drive units of the CD-ROM and the floppy disk are conceivable, but a magnetic recording device, a magneto-optical recording device and the like are also suitable. Further, as the input unit, the keyboard is conceivable, but other input means such as a voice input unit is also suitable.

According to the method for three-dimensional solid graphic generation and the record medium of three-dimensional solid graphic generation of the present invention, it has the effect of being capable of expressing the solid by changing its shape and expressing the movable solid.

What is claimed is:

1. A method for three-dimensional solid graphic generation, comprising the steps of:

inputting a basic graphic command showing a type of a graphics and a variable showing a size of the graphics into an input unit as graphic data and inputting a condition for changing the variable into the input unit; and generating thereafter a three-dimensional solid graphics by changing the size of the graphics based on the condition for changing the variable to change the shape of the graphics in an arithmetic unit.

2. The method for three-dimensional solid graphic generation according to claim 1, further comprising the steps of:

inputting a processing command for repetition control and a repetition number when the condition for changing the variable is inputted in the input unit; and generating as many three-dimensional solid graphics as the repetition number by executing processing for generating the graphics by the repetition number based on the graphic data when generating the three-dimensional solid graphics in the arithmetic unit.

3. The method for three-dimensional solid graphic generation according to claim 2, wherein the basic graphic command includes at least commands showing a cylinder, a cone and a cube.

4. The method for three-dimensional solid graphic generation according to claim 2, wherein the graphic data comprises a radius and a height when the basic graphic command is a cylinder or a cone.

5. The method for three-dimensional solid graphic generation according to claim 2, wherein the variable showing the size of the graphics is converted into an integral real number according to the change.

6. The method for three-dimensional solid graphic generation according to claim 1, further comprising the steps of:

inputting a processing command for conditional branch control and a condition for branching off processing when the condition for changing the variable is inputted in the input unit; and generating the three-dimensional solid graphics while meeting the condition for branching off the processing when generating the three-dimensional solid graphics in the arithmetic unit.

7. The method for three-dimensional solid graphic generation according to claim 6, wherein the basic graphic command includes at least commands showing a cylinder, a cone and a cube.

8. The method for three-dimensional solid graphic generation according to claim 6, wherein the graphic data comprises a radius and a height when the ba sic graphic command is a cylinder or a cone.

9. The method for three-dimensional solid graphic generation according to claim 6, wherein the variable showing the size of the graphics is converted into an integral real number according to the change.

10. A record medium of three-dimensional solid graphic generation, comprising:

a program readable by a computer being recorded therein for executing:

procedures for inputting a basic graphic command showing a type of a graphics and a variable showing a size of the graphics into an input unit as graphic data and inputting a condition for changing the variable into the input unit; and a procedure for generating a three-dimensional solid graphics by changing the size of the graphics based on the condition for changing the variable to change the shape of the graphics in an arithmetic unit.

11. The record medium of three-dimensional solid graphic generation according to claim 10, wherein said procedure for inputting the condition for changing the variable into the input unit is a procedure for inputting a processing command for repetition control and a repetition number; and wherein said procedure for generating the three-dimensional solid graphics in the arithmetic unit is a procedure for generating as many three-dimensional solid graphics as the repetition number by executing processing for generating the graphics by the repetition number based on the graphic data.

12. The record medium of three-dimensional solid graphic generation according to claim 11, wherein the basic graphic command includes at least commands showing a cylinder, a cone and a cube.

13. The record medium of three-dimensional solid graphic generation according to claim 11, wherein the graphic data comprises a radius and a height when the basic graphic command is a cylinder or a cone.

14. The record medium of three-dimensional solid graphic generation according to claim 11, wherein the variable showing the size of the graphics is converted into an integral real number according to the change.

15. The record medium of three-dimensional solid graphic generation according to claim 11, wherein the input unit comprises a keyboard and the arithmetic unit comprises a CPU.

16. The record medium of three-dimensional solid graphic generation according to claim 10, wherein said procedure for inputting the condition for changing the variable into the input unit is a procedure for inputting a processing command for conditional branch control and a condition for branching off processing into the input unit; and wherein said procedure for generating the three-dimensional solid graphics in the arithmetic unit is a procedure for generating a three-dimensional solid graphics while meeting the condition for branching off the processing.

17. The record medium of three-dimensional solid graphic generation according to claim 16, wherein the basic graphic command includes at least commands showing a cylinder, a cone and a cube.

18. The record medium of three-dimensional solid graphic generation according to claim 16, wherein the graphic data comprises a radius and a height when the basic graphic command is a cylinder or a cone.

19. The record medium of three-dimensional solid graphic generation according to claim 16, wherein the variable showing the size of the graphics is converted into an integral real number according to the change.

20. The record medium of three-dimensional solid graphic generation according to claim 16, wherein the input unit comprises a keyboard and the arithmetic unit comprises a CPU.

* * * * *